(12) United States Patent
Chen

(10) Patent No.: US 8,029,133 B2
(45) Date of Patent: Oct. 4, 2011

(54) EYEGLASSES THAT ARE ASSEMBLED EASILY AND QUICKLY

(75) Inventor: Pen-Wei Chen, Yongkang (TW)

(73) Assignee: Prohero Co., Ltd., Yongkang (TW)

( * ) Notice: Subject to any disclaimer, the term of this patent is extended or adjusted under 35 U.S.C. 154(b) by 0 days.

(21) Appl. No.: 12/614,566

(22) Filed: Nov. 9, 2009

(65) Prior Publication Data

US 2011/0109872 A1    May 12, 2011

(51) Int. Cl.
*G02C 5/22* (2006.01)
(52) U.S. Cl. .......................... 351/153; 16/228
(58) Field of Classification Search ............. 351/41, 351/111, 153, 121; 16/228
See application file for complete search history.

(56) References Cited

U.S. PATENT DOCUMENTS 7,712,894 B2 * 5/2010 Tsai ............................. 351/97
* cited by examiner

*Primary Examiner* — Huy K Mai
(74) *Attorney, Agent, or Firm* — Alan Kamrath; Kamrath & Associates PA

(57) ABSTRACT

A pair of eyeglasses include a frame having two endpieces and two temples each pivotally mounted on the respective endpiece of the frame. Each of the endpieces has a T-shaped receiving slot, and each of the temples has a T-shaped retaining flange mounted in the receiving slot of the respective endpiece. The retaining flange of each of the temples has a pivot shaft pivotally mounted in the receiving slot of the respective endpiece. Thus, a user only needs to rotate each of the temples relative to the respective endpiece to attach each of the temples to the respective endpiece so that the eyeglasses are assembled easily and quickly. In addition, each of the temples is combined with the respective endpiece without needing co-operation of any screw member and hand tool.

16 Claims, 6 Drawing Sheets

EYEGLASSES THAT ARE ASSEMBLED EASILY AND QUICKLY

BACKGROUND OF THE INVENTION

1. Field of the Invention

The present invention relates to glasses and, more particularly, to a pair of eyeglasses that are assembled easily and quickly.

2. Description of the Related Art

A pair of conventional eyeglasses 1 in accordance with the prior art shown in FIG. 9 comprise a frame 10 having two endpieces 13, two temples 11 each pivotally mounted on a respective one of the two endpieces 13 of the frame 10, and two fastening screws 12 each extending through a respective one of the two endpieces 13 of the frame 10 and a respective one of the two temples 11 to combine the respective endpiece 13 of the frame 10 and the respective temple 11. However, a user needs aid of a hand tool, such as a screwdriver and the like, to screw or unscrew the fastening screws 12 so as to assemble or detach the two temples 11 and the two endpieces 13 of the frame 10, thereby causing inconvenience to the user. In addition, each of the fastening screws 12 is easily loosened from the respective endpiece 13 of the frame 10 and the respective temple 11 so that the fastening screws 12 are easily missed or lost.

BRIEF SUMMARY OF THE INVENTION

In accordance with the present invention, there is provided a pair of eyeglasses, comprising a frame having two endpieces and two temples each pivotally and removably mounted on a respective one of the two endpieces of the frame. Each of the two endpieces of the frame has an end face provided with a substantially T-shaped receiving slot, and each of the two temples has an end face provided with a substantially T-shaped retaining flange that is removably mounted in the receiving slot of a respective one of the two endpieces of the frame. The retaining flange of each of the two temples has an end portion provided with a pivot shaft pivotally mounted in the receiving slot of the respective endpiece of the frame.

The receiving slot of each of the two endpieces of the frame has a first side provided with a first limit groove and a second side provided with a second limit groove, and the pivot shaft of the retaining flange of each of the two temples has a first side provided with a first limit portion pivotally mounted in the first limit groove of the respective endpiece of the frame and a second side provided with a second limit portion pivotally mounted in the second limit groove of the respective endpiece of the frame. The receiving slot of each of the two endpieces of the frame has a first end provided with an entrance connected between the first limit groove and the second limit groove and a second end provided with an opening connected to the entrance. The opening of the receiving slot of each of the two endpieces has a size greater than that of the entrance. The first limit groove of each of the two endpieces of the frame has an elongate shape, and the second limit groove of each of the two endpieces of the frame has an elongate shape. The first limit groove of each of the two endpieces of the frame extends in the longitudinal direction of each of the two endpieces of the frame, and the second limit groove of each of the two endpieces of the frame extends in the longitudinal direction of each of the two endpieces of the frame. The first limit portion of the pivot shaft of each of the two temples protrudes outwardly from the retaining flange, and the second limit portion of the pivot shaft of each of the two temples protrudes outwardly from the retaining flange. The first limit portion of the pivot shaft of each of the two temples is movable in and guidable by the first limit groove of the respective endpiece of the frame, and the second limit portion of the pivot shaft of each of the two temples is movable in and guidable by the second limit groove of the respective endpiece of the frame. The pivot shaft of the retaining flange of each of the two temples has a length shorter than that of the entrance of the receiving slot of the respective endpiece and greater a width of the entrance of the receiving slot of the respective endpiece. The pivot shaft of the retaining flange of each of the two temples is insertable into and rotatable in the entrance of the receiving slot of the respective endpiece so that the first limit portion of the pivot shaft of each of the two temples is inserted into and limited in the first limit groove of the respective endpiece of the frame, and the second limit portion of the pivot shaft of each of the two temples is inserted into and limited in the second limit groove of the respective endpiece of the frame.

The primary objective of the present invention is to provide a pair of eyeglasses that are assembled easily and quickly.

According to the primary objective of the present invention, a user only needs to rotate each of the two temples relative to the respective endpiece of the frame to insert the first limit portion and the second limit portion of the pivot shaft of each of the two temples into the first limit groove and the second limit groove of the respective endpiece of the frame respectively so as to attach each of the two temples to the respective endpiece of the frame and to assemble the eyeglasses so that the eyeglasses are assembled easily and quickly.

According to another objective of the present invention, each of the two temples is combined with the respective endpiece of the frame without needing co-operation of any screw member and hand tool, thereby facilitating the user assembling the eyeglasses.

According to a further objective of the present invention, the eyeglasses fall onto the ground to detach the two temples from the frame, each of the two temples can again be combined with the respective endpiece of the frame to prevent the eyeglasses from being broken and to enhance the lifetime of the eyeglasses.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
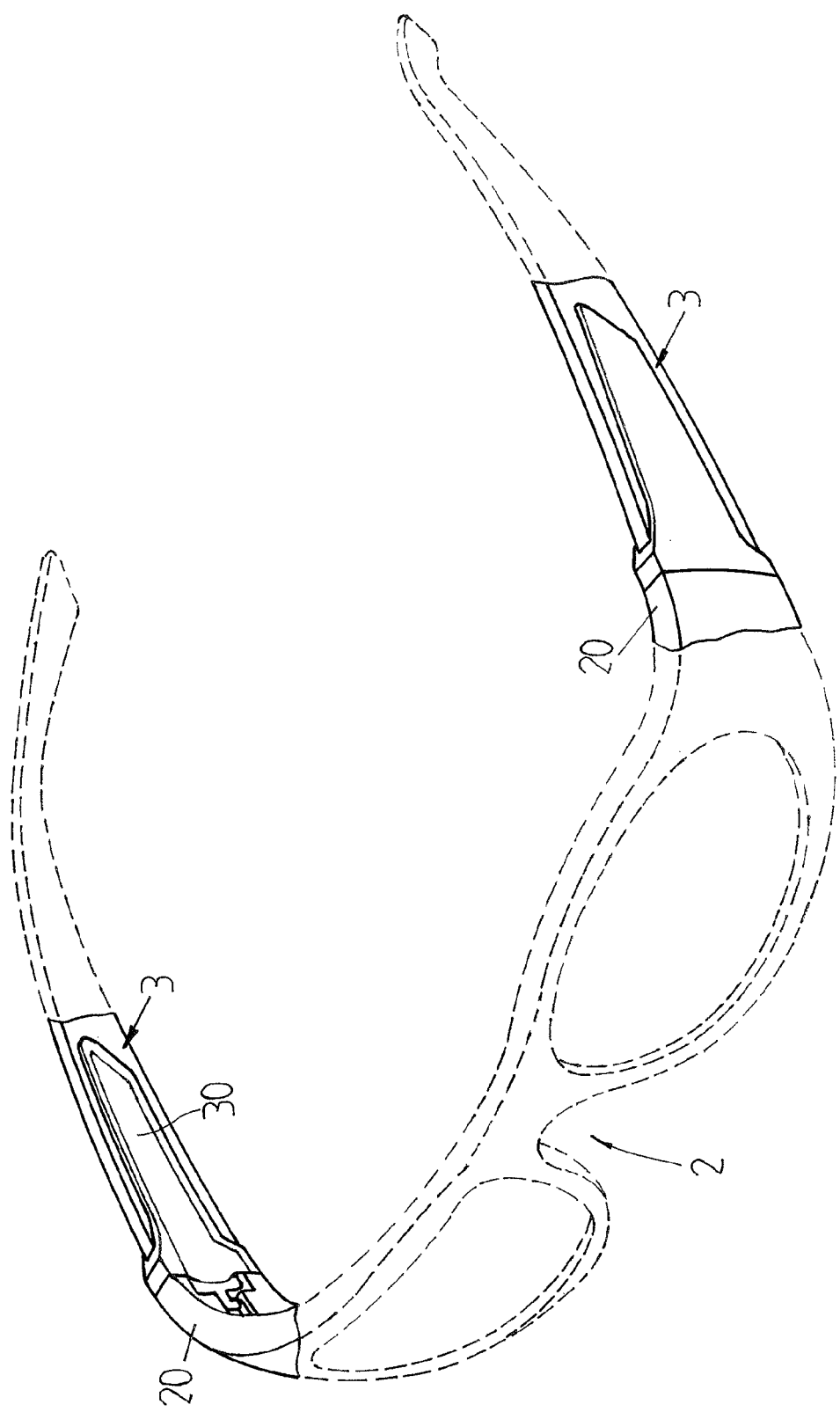
FIG. 1 is a perspective view of a pair of eyeglasses in accordance with the preferred embodiment of the present invention.
Figure 2:
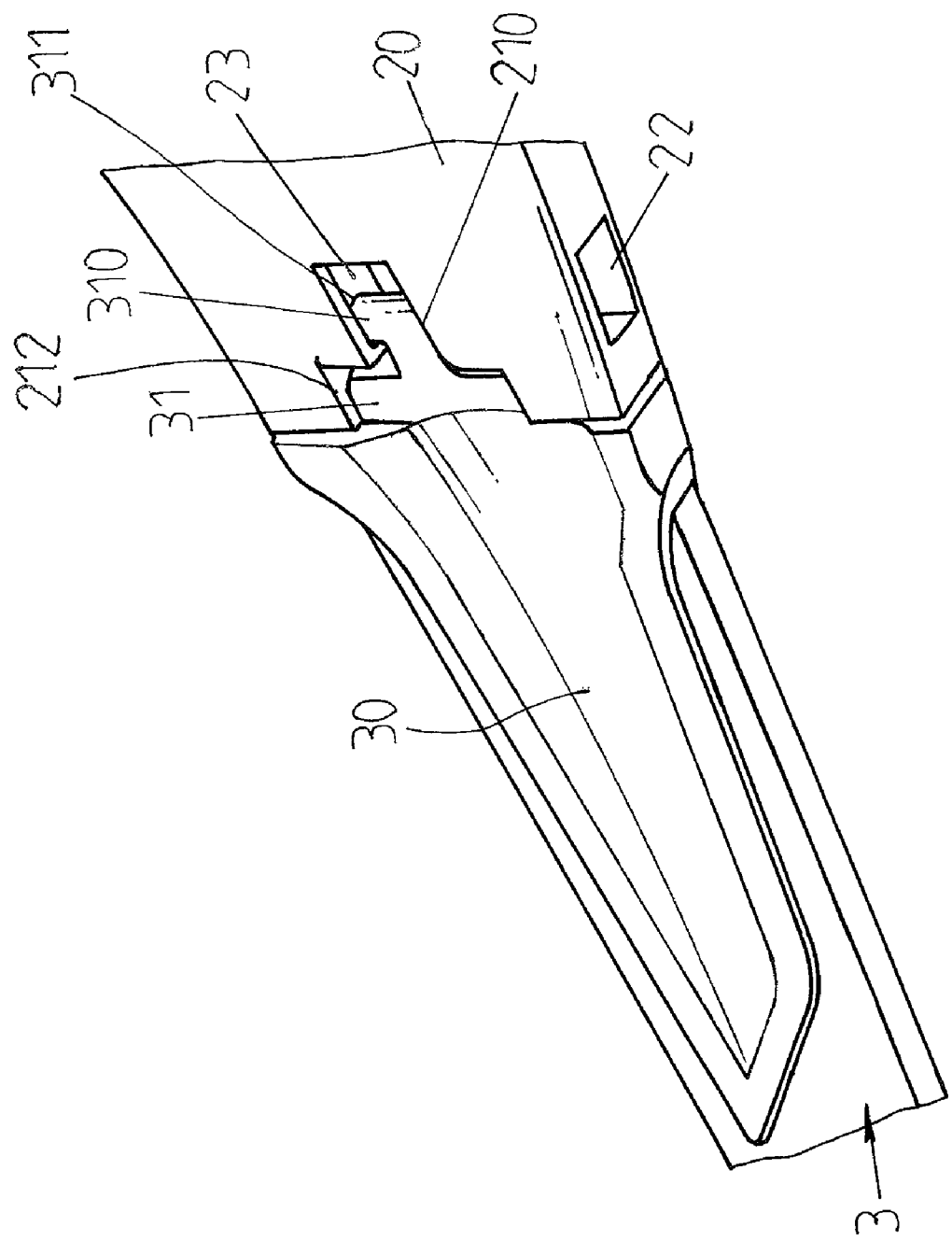
FIG. 2 is a partially perspective view of the eyeglasses as shown in FIG. 1.
Figure 3:
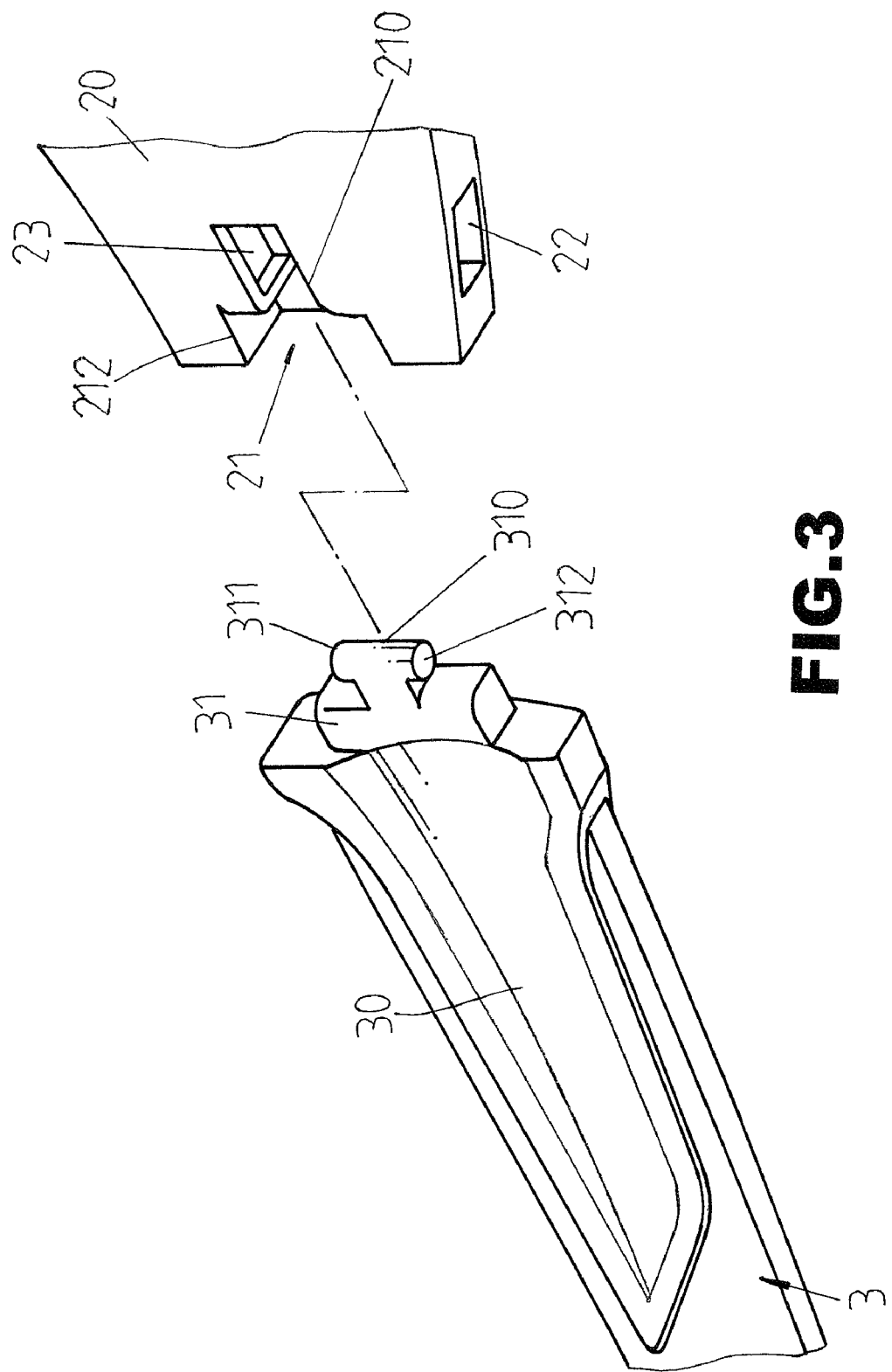
FIG. 3 is an exploded perspective view of the eyeglasses as shown in FIG. 2.

Referring to the drawings and initially to FIGS. 1-3, a pair of eyeglasses in accordance with the preferred embodiment of the present invention comprise a frame 2 having two endpieces 20 and two temples 3 each pivotally and removably mounted on a respective one of the two endpieces 20 of the frame 2.

Each of the two endpieces 20 of the frame 2 has an end face provided with a substantially T-shaped receiving slot 21. The receiving slot 21 of each of the two endpieces 20 of the frame 2 has a first side provided with a first limit groove 23 and a second side provided with a second limit groove 22. The first limit groove 23 of each of the two endpieces 20 of the frame 2 has an elongate shape and extends in the longitudinal direction of each of the two endpieces 20 of the frame 2. The second limit groove 22 of each of the two endpieces 20 of the frame 2 has an elongate shape and extends in the longitudinal direction of each of the two endpieces 20 of the frame 2.

The receiving slot 21 of each of the two endpieces 20 of the frame 2 has a first end provided with an entrance 210 connected between the first limit groove 23 and the second limit groove 22 and a second end provided with an opening 212 connected to the entrance 210 and exposed outwardly from the end face of each of the two endpieces 20 of the frame 2. The opening 212 of the receiving slot 21 of each of the two endpieces 20 has a size greater than that of the entrance 210.

Each of the two temples 3 has an end face provided with a substantially T-shaped retaining flange 31 that is removably mounted in the receiving slot 21 of a respective one of the two endpieces 20 of the frame 2. The retaining flange 31 of each of the two temples 3 has an end portion provided with a pivot shaft 310 pivotally mounted in the receiving slot 21 of the respective endpiece 20 of the frame 2.

The pivot shaft 310 of the retaining flange 31 of each of the two temples 3 is parallel with the retaining flange 31 and a transverse inner face 30 of each of the two temples 3. The pivot shaft 310 of the retaining flange 31 of each of the two temples 3 has a first side provided with a first limit portion 311 pivotally mounted in the first limit groove 23 of the respective endpiece 20 of the frame 2 and a second side provided with a second limit portion 312 pivotally mounted in the second limit groove 22 of the respective endpiece 20 of the frame 2. The first limit portion 311 of the pivot shaft 310 of each of the two temples 3 protrudes outwardly from the retaining flange 31. The first limit portion 311 of the pivot shaft 310 of each of the two temples 3 is movable in and guidable by the first limit groove 23 of the respective endpiece 20 of the frame 2. The second limit portion 312 of the pivot shaft 310 of each of the two temples 3 protrudes outwardly from the retaining flange 31. The second limit portion 312 of the pivot shaft 310 of each of the two temples 3 is movable in and guidable by the second limit groove 22 of the respective endpiece 20 of the frame 2.

The pivot shaft 310 of the retaining flange 31 of each of the two temples 3 has a length shorter than that of the entrance 210 of the receiving slot 21 of the respective endpiece 20 and greater a width of the entrance 210 of the receiving slot 21 of the respective endpiece 20. The pivot shaft 310 of the retaining flange 31 of each of the two temples 3 is insertable into and rotatable in the entrance 210 of the receiving slot 21 of the respective endpiece 20 until the first limit portion 311 of the pivot shaft 310 of each of the two temples 3 is inserted into and limited in the first limit groove 23 of the respective endpiece 20 of the frame 2, and the second limit portion 312 of the pivot shaft 310 of each of the two temples 3 is inserted into and limited in the second limit groove 22 of the respective endpiece 20 of the frame 2.

Figure 4:
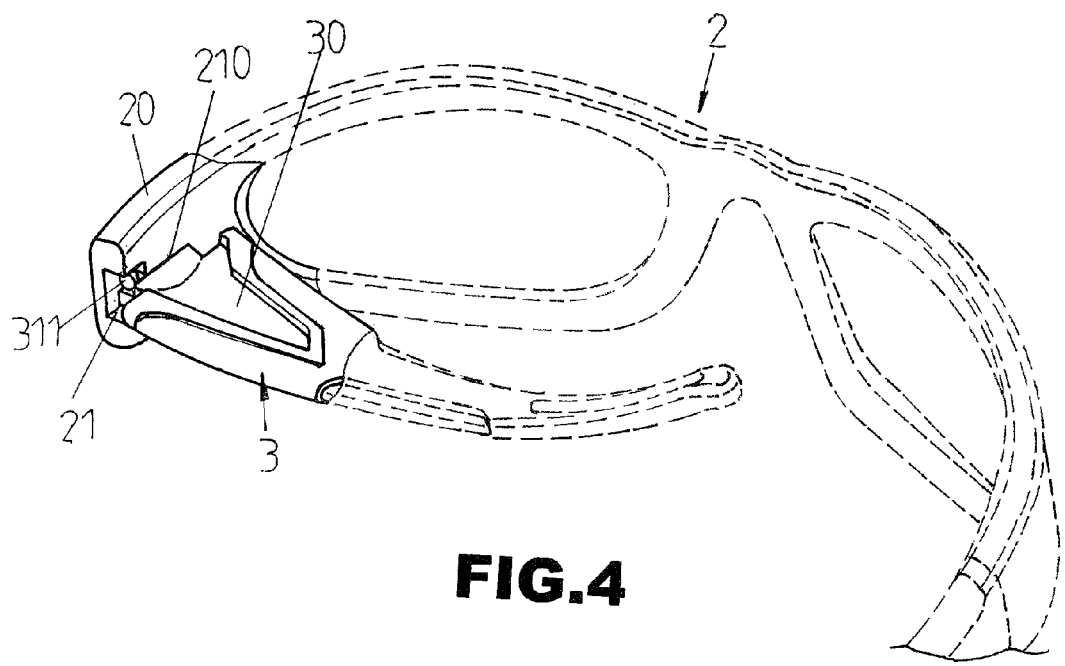
FIG. 4 is a perspective view showing assembly of the eyeglasses as shown in FIG. 1.
Figure 5:
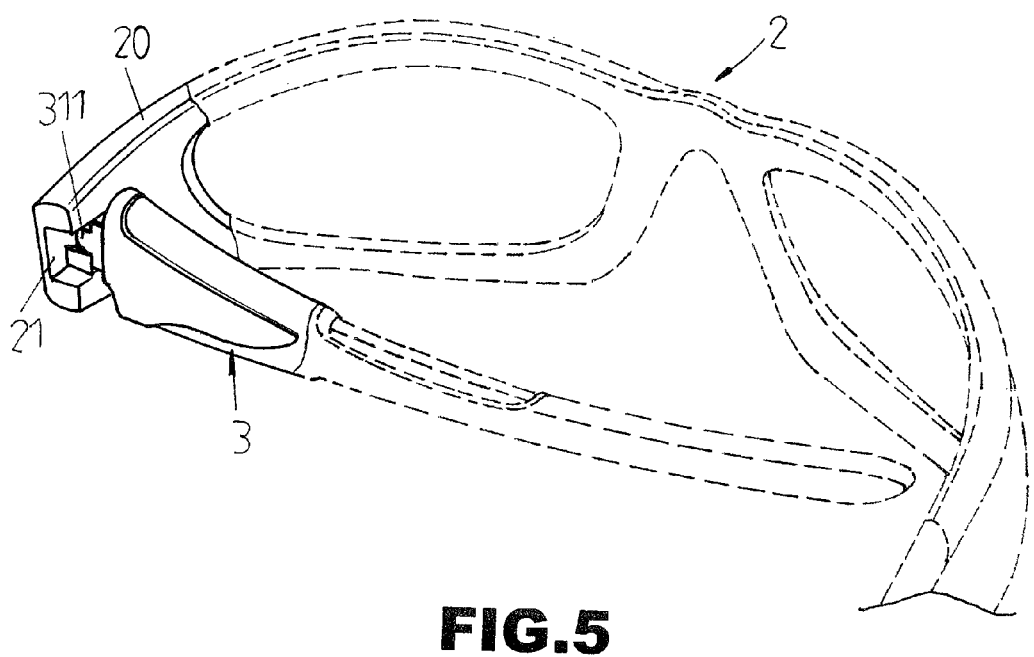
FIG. 5 is a schematic operational view of the eyeglasses as shown in FIG. 4 in assembly.
Figure 6:
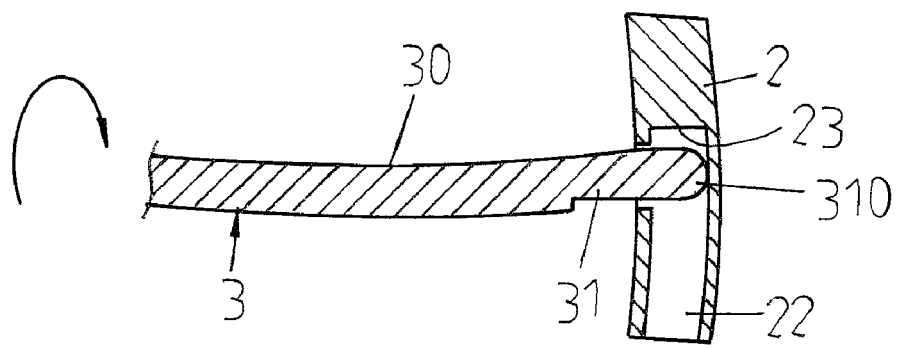
FIG. 6 is a cross-sectional view of the eyeglasses as shown in FIG. 4.
Figure 7:
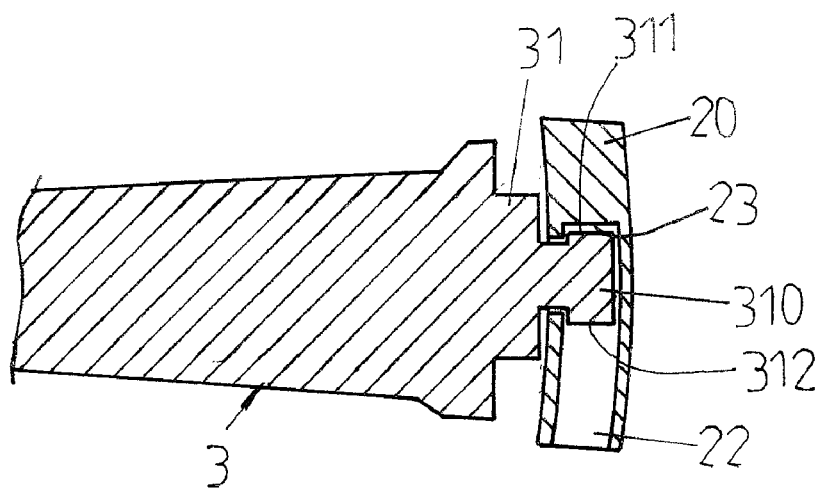
FIG. 7 is a cross-sectional view of the eyeglasses as shown in FIG. 5.
Figure 8:
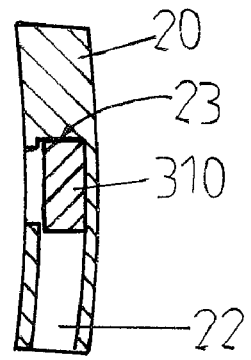
FIG. 8 is a cross-sectional view of the eyeglasses as shown in FIG. 2.
Figure 9:
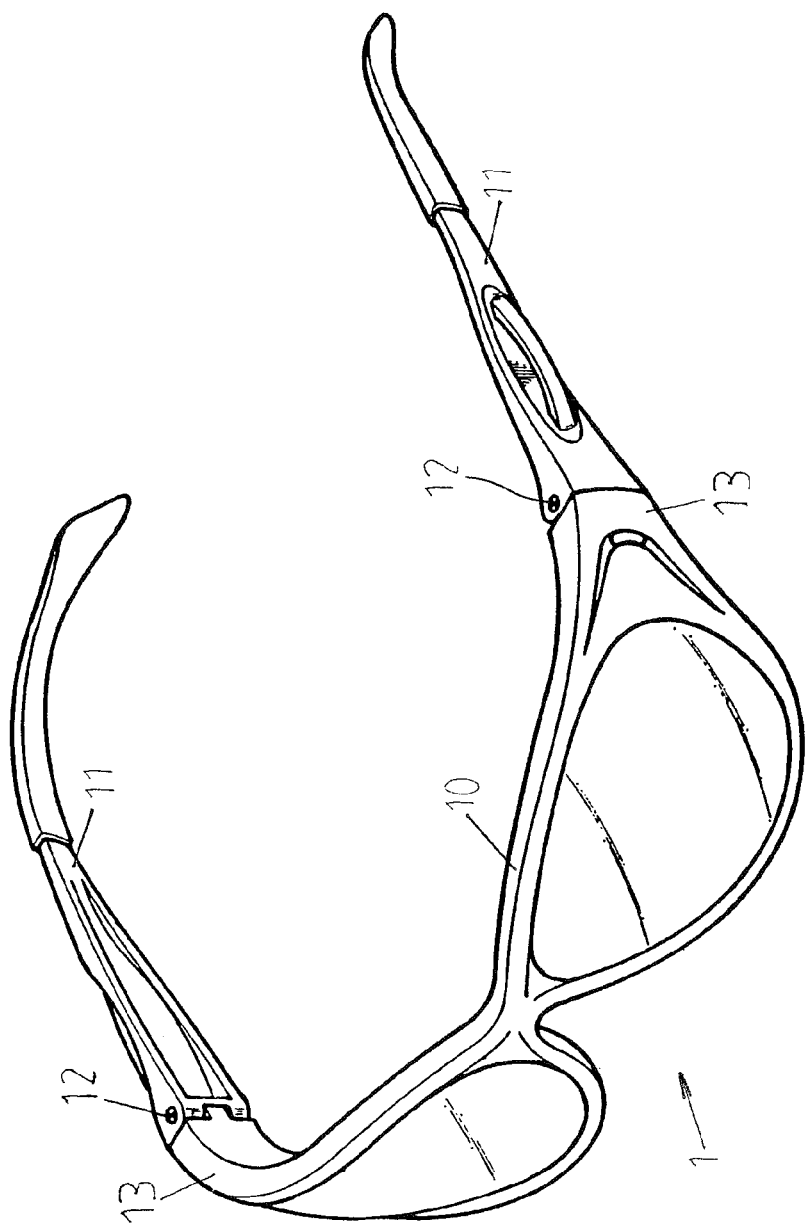
FIG. 9 is a perspective view of a pair of conventional eyeglasses in accordance with the prior art.

In assembly, referring to FIGS. 4-8 with reference to FIGS. 1-3, the pivot shaft 310 of each of the two temples 3 is initially parallel with the entrance 210 of the receiving slot 21 of the respective endpiece 20 with the transverse inner face 30 of each of the two temples 3 facing upward as shown in FIGS. 4 and 6. Then, the pivot shaft 310 of each of the two temples 3 is inserted into the entrance 210 of the receiving slot 21 of the respective endpiece 20 as shown in FIGS. 4 and 6. Then, the pivot shaft 310 of each of the two temples 3 is rotated relative to the respective endpiece 20 of the frame 2 through ninety degrees (90°) as shown in FIGS. 5 and 7 so that the first limit portion 311 of the pivot shaft 310 of each of the two temples 3 is inserted into and limited in the first limit groove 23 of the respective endpiece 20 of the frame 2, and the second limit portion 312 of the pivot shaft 310 of each of the two temples 3 is inserted into and limited in the second limit groove 22 of the respective endpiece 20 of the frame 2 to limit the pivot shaft 310 of each of the two temples 3 in the entrance 210 of the respective endpiece 20 of the frame 2 and to attach each of the two temples 3 to the respective endpiece 20 of the frame 2. Then, each of the two temples 3 is pushed and pivoted outwardly relative to the respective endpiece 20 of the frame 2 as shown in FIGS. 2 and 8 so that the pivot shaft 310 of each of the two temples 3 is pivoted in the entrance 210 of the respective endpiece 20 of the frame 2, and the retaining flange 31 of each of the two temples 3 is inserted into the receiving slot 21 of the respective endpiece 20 of the frame 2. Thus, each of the two temples 3 is expanded outwardly relative to the respective endpiece 20 of the frame 2 to expand the eyeglasses as shown in FIG. 1.

Accordingly, a user only needs to rotate each of the two temples 3 relative to the respective endpiece 20 of the frame 2 to insert the first limit portion 311 and the second limit portion 312 of the pivot shaft 310 of each of the two temples 3 into the first limit groove 23 and the second limit groove 22 of the respective endpiece 20 of the frame 2 respectively so as to attach each of the two temples 3 to the respective endpiece 20 of the frame 2 and to assemble the eyeglasses so that the eyeglasses are assembled easily and quickly. In addition, each of the two temples 3 is combined with the respective endpiece 20 of the frame 2 without needing co-operation of any screw member and hand tool, thereby facilitating the user assembling the eyeglasses. Further, when the eyeglasses fall onto the ground to detach the two temples 3 from the frame 2, each of the two temples 3 can again be combined with the respective endpiece 20 of the frame 2 to prevent the eyeglasses from being broken and to enhance the lifetime of the eyeglasses.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of eyeglasses, comprising:
 a frame having two endpieces;
 two temples each pivotally and removably mounted on a respective one of the two endpieces of the frame; wherein:
 each of the two endpieces of the frame has an end face provided with a substantially T-shaped receiving slot;
 each of the two temples has an end face provided with a substantially T-shaped retaining flange that is removably mounted in the receiving slot of a respective one of the two endpieces of the frame;

the retaining flange of each of the two temples has an end portion provided with a pivot shaft pivotally mounted in the receiving slot of the respective endpiece of the frame;

the receiving slot of each of the two endpieces of the frame has a first side provided with a first limit groove and a second side provided with a second limit groove;

the pivot shaft of the retaining flange of each of the two temples has a first side provided with a first limit portion pivotally mounted in the first limit groove of the respective endpiece of the frame and a second side provided with a second limit portion pivotally mounted in the second limit groove of the respective endpiece of the frame;

the receiving slot of each of the two endpieces of the frame has a first end provided with an entrance connected between the first limit groove and the second limit groove and a second end provided with an opening connected to the entrance;

the retaining flange of each of the two temples is partially received in the opening of the receiving slot of the respective endpiece of the frame and is partially received in the entrance of the receiving slot of the respective endpiece of the frame.

2. The eyeglasses of claim 1, wherein the opening of the receiving slot of each of the two endpieces has a size greater than that of the entrance.

3. The eyeglasses of claim 1, wherein
the first limit groove of each of the two endpieces of the frame has an elongate shape;
the second limit groove of each of the two endpieces of the frame has an elongate shape.

4. The eyeglasses of claim 3, wherein the first limit portion of the pivot shaft of each of the two temples is movable in and guidable by the first limit groove of the respective endpiece of the frame.

5. The eyeglasses of claim 3, wherein the second limit portion of the pivot shaft of each of the two temples is movable in and guidable by the second limit groove of the respective endpiece of the frame.

6. The eyeglasses of claim 1, wherein
the first limit groove of each of the two endpieces of the frame extends in the longitudinal direction of each of the two endpieces of the frame;
the second limit groove of each of the two endpieces of the frame extends in the longitudinal direction of each of the two endpieces of the frame.

7. The eyeglasses of claim 1, wherein
the first limit portion of the pivot shaft of each of the two temples protrudes outwardly from the retaining flange;

the second limit portion of the pivot shaft of each of the two temples protrudes outwardly from the retaining flange.

8. The eyeglasses of claim 1, wherein the pivot shaft of the retaining flange of each of the two temples has a length shorter than that of the entrance of the receiving slot of the respective endpiece and greater a width of the entrance of the receiving slot of the respective endpiece.

9. The eyeglasses of claim 8, wherein the pivot shaft of the retaining flange of each of the two temples is insertable into and rotatable in the entrance of the receiving slot of the respective endpiece so that the first limit portion of the pivot shaft of each of the two temples is inserted through the entrance of the receiving slot into and limited in the first limit groove of the respective endpiece of the frame, and the second limit portion of the pivot shaft of each of the two temples is inserted through the entrance of the receiving slot into and limited in the second limit groove of the respective endpiece of the frame.

10. The eyeglasses of claim 1, wherein the pivot shaft of the retaining flange of each of the two temples is parallel with the retaining flange.

11. The eyeglasses of claim 1, wherein the pivot shaft of the retaining flange of each of the two temples is parallel with a transverse inner face of each of the two temples.

12. The eyeglasses of claim 1, wherein the opening of the receiving slot of each of the two endpieces is disposed at and exposed outwardly from a distal portion of the end face of each of the two endpieces of the frame, and the entrance of the receiving slot of each of the two endpieces is disposed at a proximal portion of the end face of each of the two endpieces of the frame.

13. The eyeglasses of claim 1, wherein the first limit groove of the receiving slot of each of the two endpieces of the frame has a sidewall that is located between the first limit groove and the opening to separate the first limit groove from the opening.

14. The eyeglasses of claim 1, wherein the second limit groove of the receiving slot of each of the two endpieces of the frame has a sidewall that is located between the second limit groove and the opening to separate the second limit groove from the opening.

15. The eyeglasses of claim 1, wherein the retaining flange of each of the two temples has a reduced length that is shorter than a length of the end face of each of the two temples.

16. The eyeglasses of claim 1, wherein the opening of the receiving slot of each of the two endpieces of the frame is located between the end face of the respective temple and the entrance of the receiving slot of each of the two endpieces of the frame.

* * * * *